United States Patent
Hassan et al.

(10) Patent No.: US 9,801,118 B2
(45) Date of Patent: Oct. 24, 2017

(54) WLAN DISCOVERY AND NOTIFICATION

(71) Applicant: T-Mobile USA, Inc., Bellevue, WA (US)

(72) Inventors: Omar Hassan, Kirkland, WA (US); Senthil Kumar Mulluppadi Velusamy, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 29 days.

(21) Appl. No.: 13/828,279

(22) Filed: Mar. 14, 2013

(65) Prior Publication Data

US 2013/0242964 A1 Sep. 19, 2013

Related U.S. Application Data

(60) Provisional application No. 61/612,170, filed on Mar. 16, 2012.

(51) Int. Cl.
*H04W 48/16* (2009.01)
*H04W 48/18* (2009.01)
*H04W 48/00* (2009.01)
*H04W 88/06* (2009.01)

(52) U.S. Cl.
CPC .......... *H04W 48/16* (2013.01); *H04W 48/18* (2013.01); *H04W 48/00* (2013.01); *H04W 88/06* (2013.01)

(58) Field of Classification Search
CPC ..... H04W 88/06; H04W 48/18; H04W 48/16; H04W 84/12; H04W 48/02; H04W 48/00; H04W 88/02; H04W 48/08; H04W 48/20
USPC ....... 370/338, 328, 329, 332, 310, 254, 341, 370/908, 331; 455/552.1, 426.1, 67.11
See application file for complete search history.

(56) References Cited

U.S. PATENT DOCUMENTS

| 8,095,172 B1 * | 1/2012 | Cole | H04W 48/18 370/254 |
|---|---|---|---|
| 2007/0076665 A1 * | 4/2007 | Nair | H04W 48/18 370/335 |
| 2007/0286384 A1 * | 12/2007 | Christensen | H04L 29/06027 379/201.07 |

(Continued)

FOREIGN PATENT DOCUMENTS

KR 1020050072686 7/2005

OTHER PUBLICATIONS

PCT Search Report and Written Opinion mailed Apr. 29, 2013 for PCT Application No. PCT/US13/32077, 12 pages.

*Primary Examiner* — Michael Thier
*Assistant Examiner* — Rownak Islam
(74) *Attorney, Agent, or Firm* — Lee & Hayes, PLLC

(57) ABSTRACT

A wireless local area network (WLAN) management procedure for a telecommunication device is disclosed. A WLAN management entity is operable to detect a communication event associated with a voice call, a video call, or a data transfer session, and then determine a current state of a cellular network. When the current state of the cellular network is deemed problematic, is otherwise unavailable, and/or when an alternative, higher-throughput WLAN is available, the WLAN management entity identifies available WLANs for enabling the corresponding communication. Subsequently, the WLAN management entity generates a notification, presenting an option for selecting an available WLAN, based in part on the current state of the cellular network.

16 Claims, 8 Drawing Sheets

(56) References Cited

U.S. PATENT DOCUMENTS

| | | | |
|---|---|---|---|
| 2008/0009324 A1* | 1/2008 | Patel | H04W 48/18 455/566 |
| 2008/0049623 A1* | 2/2008 | Qiu et al. | 370/241 |
| 2009/0011773 A1* | 1/2009 | Balachandran | H04W 84/12 455/456.1 |
| 2010/0008337 A1 | 1/2010 | Bajko | |
| 2010/0082821 A1* | 4/2010 | Rosenblatt | G06F 15/16 709/228 |
| 2010/0106345 A1* | 4/2010 | Hwang | G07C 5/0816 701/2 |
| 2010/0110890 A1* | 5/2010 | Rainer | H04M 15/00 370/232 |
| 2010/0279620 A1* | 11/2010 | Paas | H04M 1/72519 455/67.7 |
| 2010/0302958 A1* | 12/2010 | Wietfeldt et al. | 370/252 |
| 2011/0044177 A1* | 2/2011 | Nair | H04L 41/12 370/241 |
| 2011/0310875 A1* | 12/2011 | Tysowski | H04W 48/16 370/338 |
| 2012/0294293 A1* | 11/2012 | Kahn | H04W 48/18 370/338 |
| 2013/0070739 A1* | 3/2013 | McCann et al. | 370/338 |
| 2013/0163442 A1* | 6/2013 | Livingston | H04W 48/16 370/252 |

* cited by examiner

WLAN DISCOVERY AND NOTIFICATION

CROSS REFERENCE TO RELATED PATENT APPLICATIONS

This patent application claims priority filing benefit from U.S. Provisional Patent Application No. 61/612,170, filed Mar. 16, 2012, which is hereby incorporated by reference, in its entirety.

BACKGROUND

Modern telecommunication service providers may allow access to their respectively telecommunication services by selling their customers prepaid or postpaid cellular service and data rate plans, which are associated with customer-specific service level agreements. A particular service provider may also require its customers to purchase proprietary communication devices, including: cellular phones, personal digital assistants, tablet computers, and the like, in order to access its wireless services. Today, these telecommunication devices are generally capable of accessing both licensed 2G, 3G, and 4G telecommunication networks, as well as unlicensed wireless local area networks (WLANs), such as public Wi-Fi® networks.

The Institute of Electrical and Electronics Engineers (IEEE) defines Wi-Fi® under its 802.11 wireless communication standards. Wi-Fi® access points, which are analogously referred to as "hotspots" or "WLANs," typically provide for a communication range of approximately 20 to 30 meters when a Wi-Fi® hotspot is located indoors. Coverage can be extended when a Wi-Fi® hotspot is located outside, due to a lack of surrounding radio-interference structures, i.e., walls, furniture, and the like. Additionally, public Wi-Fi® can allow for relatively high-throughput data rate communications that may employ various data security technologies, including wired equivalent privacy (WEP), Wi-Fi® protected access (WPA), or Wi-Fi® protected access II (WPA2) encryption.

At present, most home and businesses Internet service subscribers utilize Wi-Fi® hotspots to provide wireless access to their local computing devices. As such, there has been a proliferation of many new, low-power WLANs (employing unlicensed spectrum) in most metropolitan cellular coverage areas that can experience fluctuating network congestion and/or interference. Further, these densely-populated metropolitan regions may include one or more cellular coverage area "dead spots," where cellular service is unavailable, i.e., within a shielded structures, such as in a building or in a tunnel.

Wi-Fi® access points may be available to fill these coverage gaps and/or to provide for alternative cost-free (from the perspective of a telecommunication service provider) broadband Internet access. These distributed WLANs can enable various IP communication services, including voice over Internet Protocol (VoIP) calling, video calling, and data transfer sessions associated with one or more software applications. Accordingly, it would be beneficial for telecommunication service providers to configure their proprietary devices to take advantage of untapped Wi-Fi® bandwidth.

However, WLAN service boundaries are not visible to users, and these small coverage areas may not be readily discoverable by a majority of modern telecommunication devices. For instance, a user may not be aware that WLAN coverage is available at his or her present location, and as such, the user may not attempt WLAN communications even when one or more high throughput Wi-Fi access points are available and accessible by the user's telecommunication device. Additionally, a user may be engaged in a WLAN communication session and not realize that he or she is about to exit a corresponding serving Wi-Fi® coverage area, thereby resulting in a failed call or data transfer.

Accordingly, there is an opportunity to improve upon WLAN discovery and notification to enhance a quality of service (QoS) provided by individual telecommunication service providers. Further, these service providers should explore new ways to improve upon their collective customers' quality of experience (QoE), in view of the proliferation of numerous WLAN access options.

BRIEF DESCRIPTION OF THE DRAWINGS

The Detailed Description is set forth with reference to the accompanying figures.

DETAILED DESCRIPTION

This disclosure describes various wireless local area network (WLAN) discovery and notification procedures that can be employed within wireless telecommunication devices, such as provider-issued cellular telephones, smart phones, or tablets, to enable various network communication service selections. In various embodiments, discussed further herein, distributed WLAN resources that are associated with surplus Wi-Fi® bandwidth, can be discovered on a per-subscriber basis, relative to subscriber location and/or movement. This dynamic WLAN discovery can enable a user of a proprietary telecommunication device to make timely decisions as to whether to establish, continue, and/or discontinue a communication session with available WLAN resources.

Figure 1:
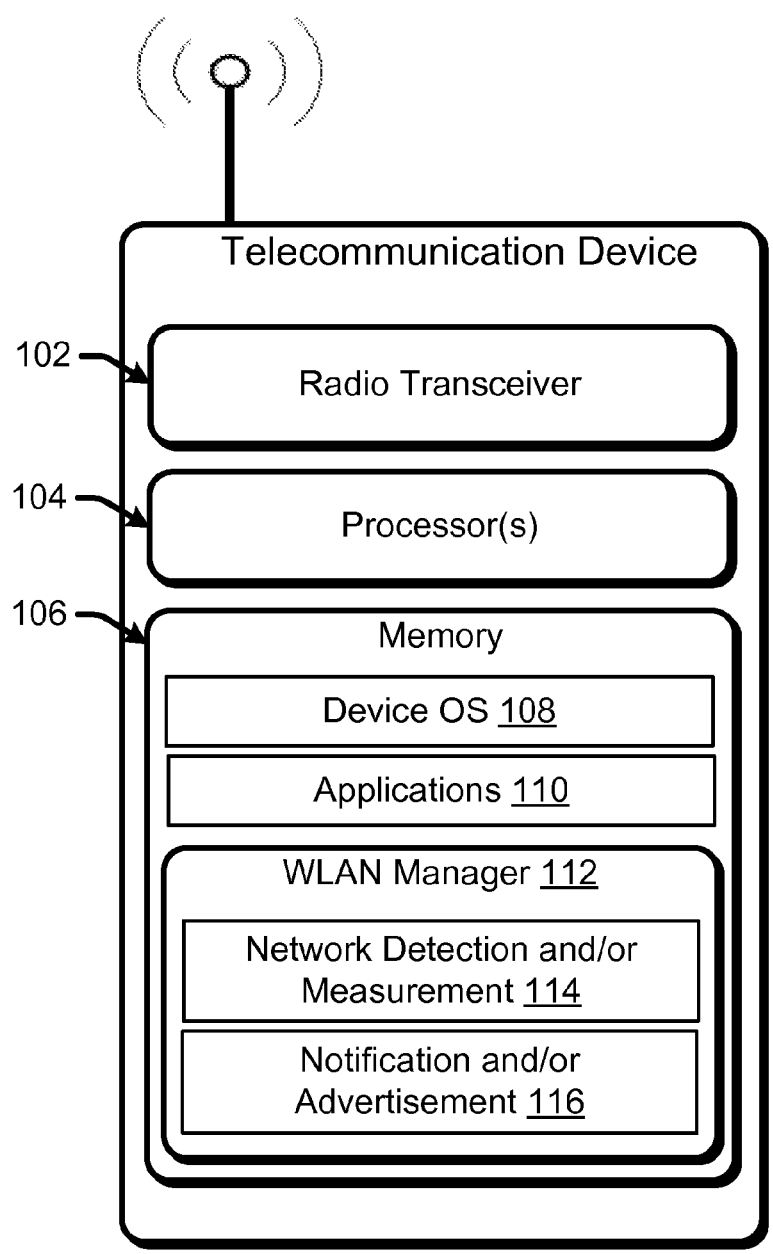
FIG. 1 depicts a hardware platform of a telecommunication device having a WLAN manager component stored in memory, in accordance with embodiments of the disclosure.

FIG. 1 depicts a hardware platform of a telecommunication device 100 including a WLAN manager component 112 that is configured to implement various WLAN discovery and notification procedures, in accordance with various communication scenarios. The telecommunication device 100 can be representative of any type of modern wireless communication device, including, but not limited to, a cellular phone or smart phone, a tablet computer, an electronic book device, a handheld gaming unit, or a personal media player.

In various implementations, the telecommunication device 100 might be configured to communicate within a 2G, 3G, or 4G, telecommunication network, and a WLAN, using any common wireless access technology, including, but not limited to, Long Term Evolution (LTE)/LTE Advanced technology, High-Speed Data Packet Access (HSDPA)/Evolved High-Speed Packet Access (HSPA+) technology, Universal Mobile Telecommunications System (UMTS) technology, Code Division Multiple Access (CDMA) technology, Global System for Mobile Communications (GSM) technology, WiMax® technology, or WiFi® technology. Further, the telecommunication device 100 may be configured to run any common mobile device operating system, including, but not limited to, Microsoft Windows Mobile®, Google Android®, Apple iOS®, or Linux Mobile®.

In some embodiments, the telecommunication device 100 may include, but is not limited to, a radio transceiver component 102 having one or more radio communication technology-specific antennae and modems for communicating over any of above-noted 2G, 3G, or 4G telecommunication networks and WLANs, one or more processor(s) 104 having any number of processing cores, and a memory 106 storing at least a device operating system (OS) 108, one or more software applications 110, and a WLAN manager component 112. In an exemplary implementation, the WLAN manager component 112 can include a network detection/measurement component 114, as well as a notification/advertisement component 116.

Although not explicitly depicted in FIG. 1, each of the one or more processor(s) 104 of the telecommunication device 100 can include a central processing unit (CPU) having any number of arithmetic logic units (ALUs), configured to perform arithmetic and logical operations, as well as, one or more control units (CUs) configured to extract instructions and other content from processor-level cache memory, and then execute the instructions by calling on the ALUs, as necessary, during program execution. In various embodiments, the processor(s) 104 may be configured to execute the WLAN manager component 112, the device OS 108, as well as any of the computer applications 110 stored in the telecommunication device's 100 memory 106. In various embodiments, the memory 106 of the telecommunication device 100 may be associated with any common type of, and any combination of, volatile memory (RAM) and/or non-volatile (ROM) memory.

In an implementation, the network detection/measurement component 114 of the WLAN manager component 112 may be configured to detect a current state of a serving 2G, 3G, or 4G telecommunication network by measuring one or more radio coverage quality of service (QoS) metrics (e.g., QoS measurements associated with one or more of, Tx/Rx signal strength, data throughput, network congestion, interference levels, etc.). For instance, the WLAN manager component 112 can evaluate one or more QoS measurements taken by the network detection/measurement component 114, to determine whether a current state of a serving telecommunication network is associated with good cellular coverage, poor cellular coverage, or no cellular coverage (e.g., a failed cellular coverage). It should be understood that the network detection/measurement component 114 of the WLAN manager component 112 may employ the radio transceiver 102 of the telecommunication device 100 to make various QoS measurements, in accordance with some embodiments of the disclosure.

In various implementations, the notification/advertisement component 116 of the WLAN manager component 112 may be configured to generate and/or present a notification that indicates/identifies an availability of one or more available WLANs (e.g., available Wi-Fi® access points located in the same geographic vicinity as the telecommunication device 100). In some scenarios, the one or more available WLANs may be identified (e.g., as detected by the network detection/measurement component 114) in response to the WLAN manager component 112 determining a current state of a serving telecommunication network to be associated with either a poor or a failed cellular coverage.

In some scenarios, the notification may be generated to include an option for selecting one or more available WLANs to enable a voice call, a video call, or a data transfer session. Further, when a communication event is associated with an initiation of a voice call or a voice call fail, the notification may be generated to include an option for selecting a voice over Internet protocol (VoIP) calling application for enabling a corresponding voice call. Likewise, when a communication event is associated with an initiation of a video call or a video call fail, the notification may be generated to include an option for selecting a video calling application for enabling a corresponding video call. Additionally, when a communication event is associated with an initiation of a data transfer session or a data transfer session fail, the notification may be generated to include an option for selecting a software application 110 associated with the data type of the data transfer session for enabling a corresponding data transfer session.

Figure 2:
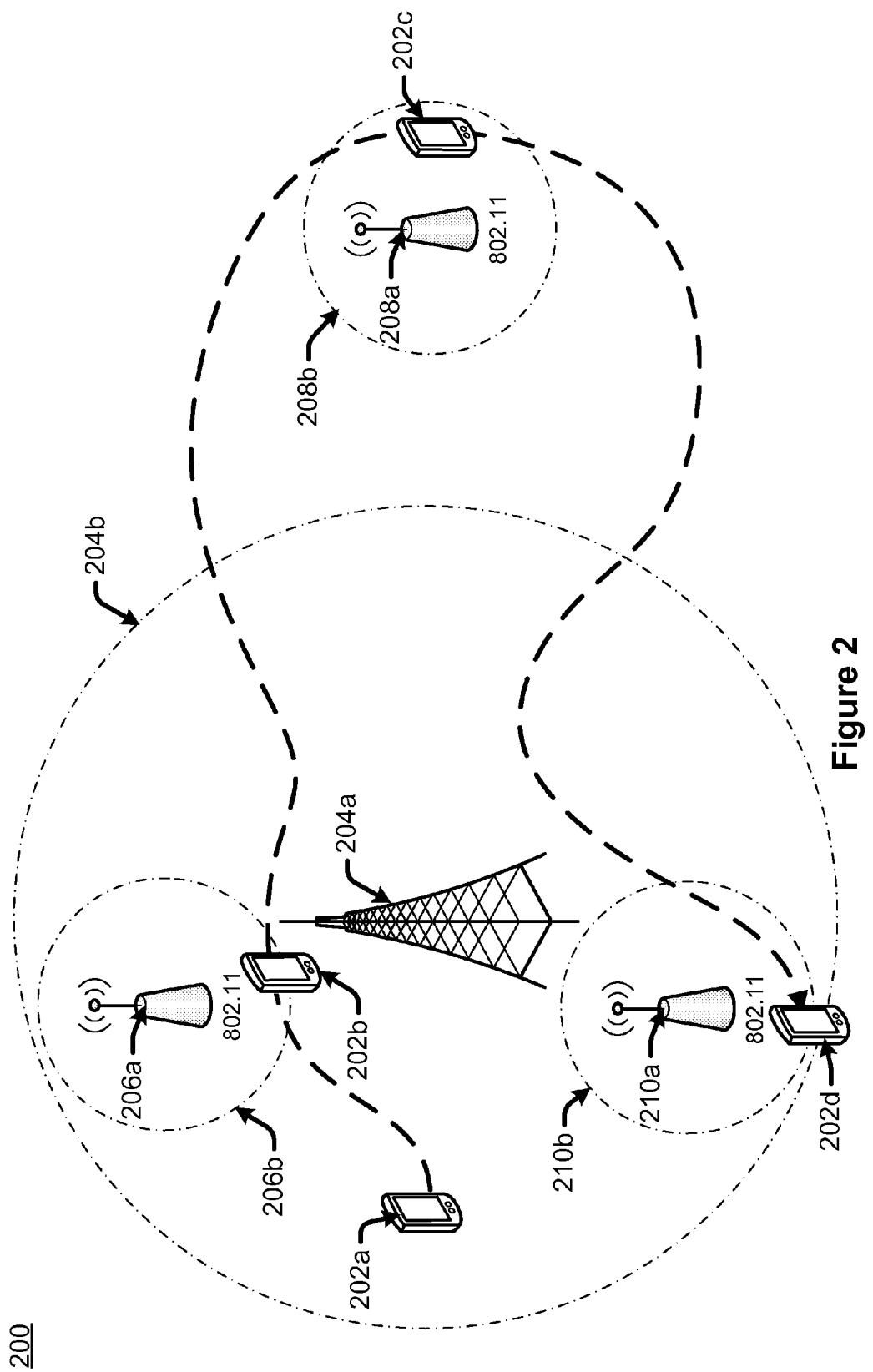
FIG. 2 depicts a network diagram of an example WLAN discovery process for a roaming telecommunication device, in accordance with various implementations of the disclosure.

FIG. 2 depicts a network diagram 200 of an example WLAN discovery for a roaming telecommunication device 202*a-d*, in accordance with various implementations of the disclosure. In an embodiment, the telecommunication device 202*a* may initially be located within a coverage area 204*b* of a cellular access point 204*a*. At the initial location of the telecommunication device 202*a*, a current state of the corresponding cellular coverage of the cellular access point 204*a* may be associated with relatively good cellular coverage. By way of example, in response to the WLAN manager component 112 detecting a communication event (e.g., a communication event associated with a voice call), the WLAN manager component 112 may collaborate with the network detection/measurement component 114 to make one or more QoS measurements (e.g., measurements associated with one or more of, Tx/Rx signal strength, data throughput, network congestion, interference levels, etc.) to determine a current state of the cellular network coverage 204*b*.

Subsequently, the telecommunication device 202*b* may roam into a different location within the coverage area 204*b* of a cellular access point 204*a*, and simultaneously within a coverage area 206*b* of a WLAN access point 206*a* that is IEEE 802.11 enabled. At this new location of the telecommunication device 202*b*, a current state of the corresponding cellular coverage 204*b* of the cellular access point 204*a* may be determined to be associated with relatively poor cellular coverage. For example, the network detection/measurement component 114 of the WLAN manager component 112 may be configured to detect and/or identify the WLAN coverage 206*b* of the WLAN access point 206*a* as a relatively high-throughput communication alternative to the relatively poor cellular coverage 204b provided by the cellular access point 204a.

In this scenario, the notification/advertisement component 116 of the WLAN manager component 112 may be configured to generate and/or present a notification at a display of the telecommunication device, which includes an option for selecting the WLAN coverage 206b of the WLAN access point 206a to enable the voice call. Further, the notification may also include an option for selecting a VoIP calling application for enabling the voice call within the WLAN coverage area 206b. In various embodiments, a selection to switch to a WLAN coverage alternative may be made at the discretion of a user, whom is privy to information that is not traditionally detectable by a computing device.

For example, the user of the telecommunication device 202b may know that he or she is actively roaming, or is otherwise still in transit. In this scenario, it would not make sense for the user to select to switch to a WLAN coverage alternative, as the user may only reside within the WLAN coverage area 206b of the WLAN access point 206a for a short period of time. Alternatively, in a scenario where the user of the telecommunication device 202b, knew that he or she were going to remain within the WLAN coverage area 206b of the WLAN access point 206a for an extended period of time, it would make sense for the user to select to a to switch to this WLAN coverage alternative, as opposed to continuing to communicate within the relatively poor cellular coverage area 204b of the cellular access point 204a.

In an embodiment, the telecommunication device 202c may continue to roam outside the corresponding coverage areas, 204b and 206b, of both the cellular access point 204a and the first WLAN access point 206a, into the coverage area 208b of another WLAN access point 208a that is also IEEE 802.11 enabled. Similar WLAN discovery and notification procedures can take place as this new location to allow the user of the telecommunication device 202c to select an option to switch to the coverage area 208b of the second WLAN access point 208a for conducting the same, or a different, voice call.

Thereafter, the telecommunication device 202d may continue roam into the coverage areas, 204b and 210b, of both the cellular access point 204a and a third WLAN access point 210a that is IEEE 802.11 enabled. Again, various related WLAN discovery and notification procedures can take place at this new location to allow a user of the telecommunication device 202d to select to an option to switch to a coverage 210b of the third WLAN access point 210a for conducting the same, or a different, voice call.

Figure 3:
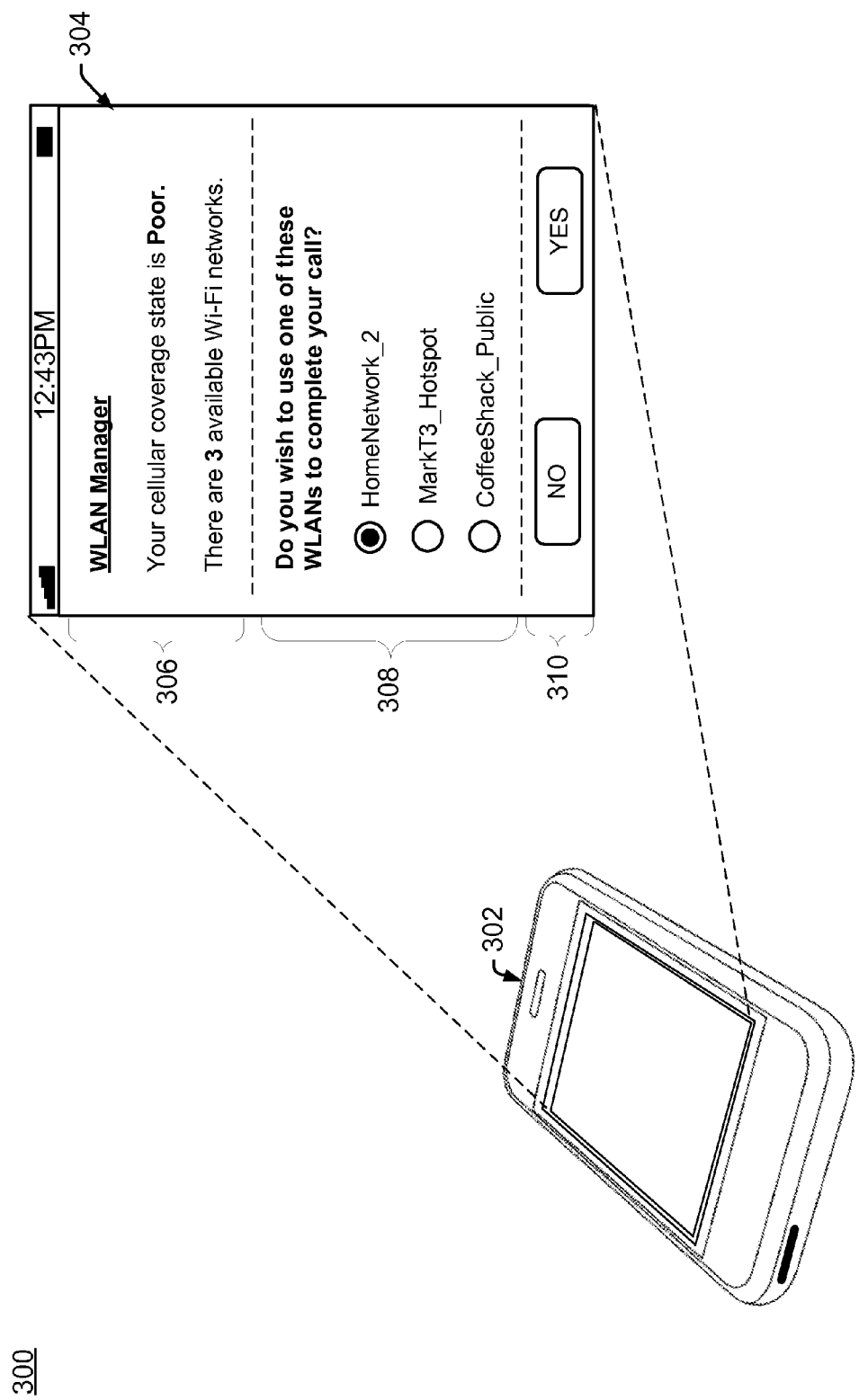
FIG. 3 depicts a notification interface of a WLAN manager at a telecommunication device, where a cellular coverage state is poor, in accordance with embodiments of the disclosure.

FIG. 3 depicts a diagram 300 including an example notification interface 304 presented at a display of a telecommunication device 302. In various implementations, the notification interface 304 may correspond to an interface that is generated and/or displayed by the notification/advertisement component 116 of the WLAN manager component 112. In an embodiment, the notification interface 304 may include an area 306 identifying a current state of a cellular coverage as being associated with a relatively "Poor" cellular coverage state (e.g. a cellular coverage state associated with the cellular coverage area 204b of the cellular access point 204a of FIG. 2), and a number of available Wi-Fi® networks.

The notification interface 304 can also include an area 308 presenting an option allowing a user of the telecommunication device 302 to select an available WLAN to complete a call, such as a voice call or a video call that is either being initiated or that is already in progress. After a WLAN selection has been made, the user the telecommunication device 302 can switch to a selected WLAN (e.g., "Home-Network_2") by clicking the "YES" button in the command button area 310 of the notification interface 304.

Figure 4:
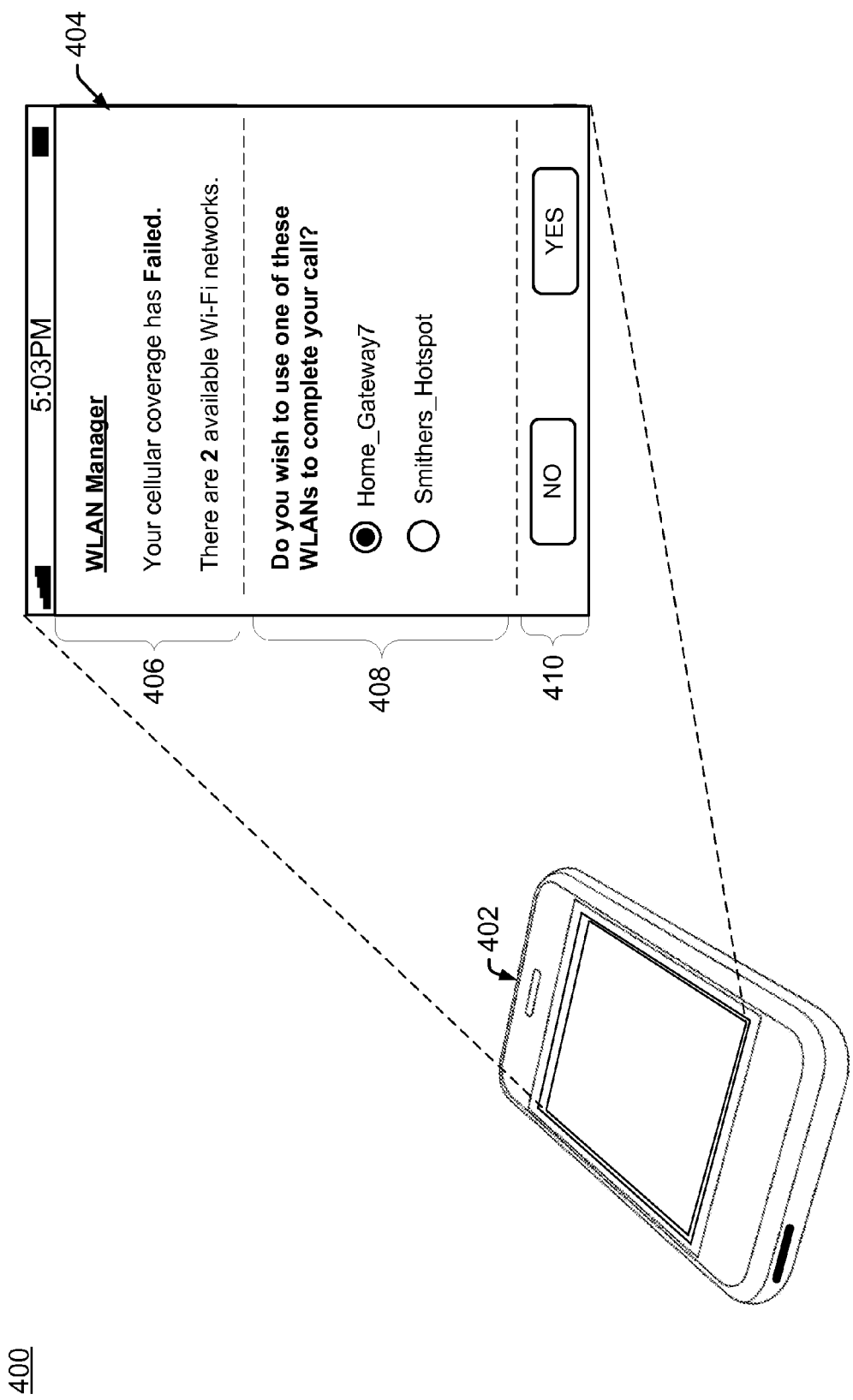
FIG. 4 depicts a notification interface of a WLAN manager at a telecommunication device, when a cellular coverage state has failed, in accordance with embodiments of the disclosure.

FIG. 4 depicts a diagram 400 including an example notification interface 404 presented at a display of a telecommunication device 402. In various embodiments, the notification interface 404 may correspond to an interface that is generated and/or displayed by the notification/advertisement component 116 of the WLAN manager component 112. In one scenario, the notification interface 404 may include an area 406 identifying a current state of a cellular coverage as being associated with a "Failed" cellular coverage state, and a number of available Wi-Fi® networks.

The notification interface 404 can also include an area 408 presenting an option allowing a user of the telecommunication device 402 to select an available WLAN to complete a call, such as a voice call or a video call that is either being initiated or that is already in progress. After a WLAN selection has been made, the user the telecommunication device 402 can switch to a selected WLAN (e.g., "Home_Gateway7") by clicking the "YES" button in the command button area 410 of the notification interface 404.

Figure 5:
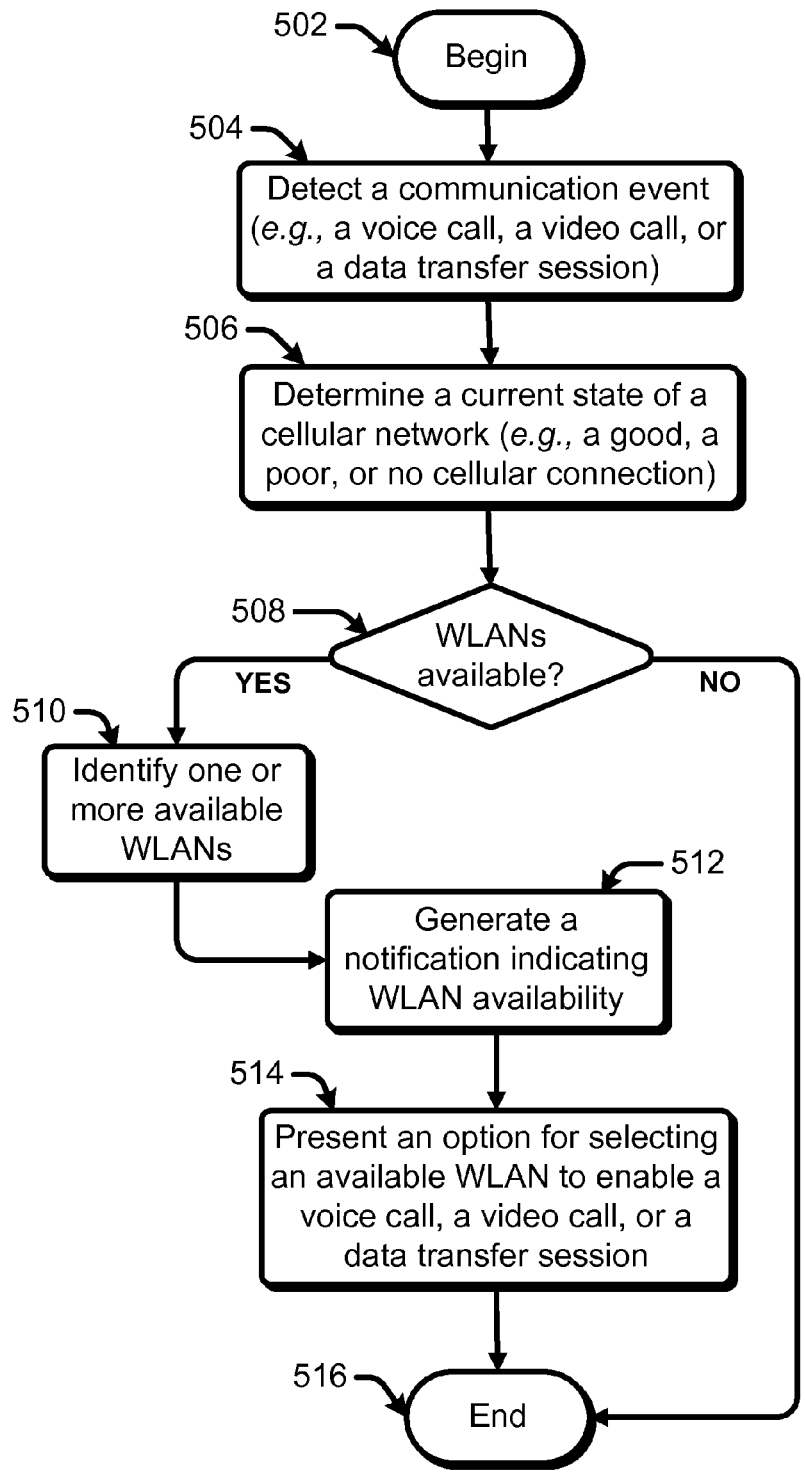
FIG. 5 depicts a flow diagram showing a WLAN discovery and notification procedure, which is initiated in response to a communication event, in accordance with embodiments of the disclosure.

FIG. 5 depicts a flow diagram showing a WLAN discovery and notification procedure 500, which may be initiated in response to a communication event that is associated with a voice call, a video call, or a data transfer session, in accordance with embodiments of the disclosure. The WLAN discovery and notification procedure 500 begins block 502, at a time when a communication event occurs (e.g., a voice call initiation, a video call initiation, a data transfer session initiation, a voice call failure, a video call failure, or a data transfer session failure).

Initially, at block 504, the communication event is detected (e.g., by the network detection/measurement component 114 of the WLAN manager 112). Next, at block 506, a current state of a cellular network is determined. In various embodiments the current state of the cellular network may be associated with good cellular coverage, poor cellular coverage, or no cellular coverage, such as a failed cellular coverage or a dead spot in the cellular coverage area.

In some situations, the network detection/measurement component 114 of the WLAN manager 112 can employ the radio transceiver 102 to measure one or more QoS metrics (e.g., QoS metrics associated with one or more of, Tx/Rx signal strength, data throughput, network congestion, interference levels, etc.) associated with a serving cellular access point, and then determine the current state of the cellular network based in part on the measured QoS metrics.

Next, at decision block 508 a determination is made as to whether one or more WLANs are available as an alternative communication network to the cellular network. In a scenario where NO other WLANs are available as an alternative communication network, the process ends at block 518. In this situation, the current cellular service is maintained until another communication service becomes available. Alternatively, in a scenario where one or more other WLANs are available as an alternative communication network, the process proceeds to block 510, where all available WLANs are identified as alternative communication service options.

Then, the process proceeds to block 512 where a notification indicating WLAN availability is generated. In an embodiment, the notification/advertisement component 116 of the WLAN manager may be responsible for generating the notification indicating WLAN availability, as is depicted in the notification interfaces, 304 and 404, of FIGS. 3 and 4. Thereafter, at block 514, an option for selecting an available WLAN to enable a voice call, a video call, or a data transfer session is presented (e.g., via the notification interfaces 304 and 404). Subsequently, the process ends at block 518.

Figure 6:
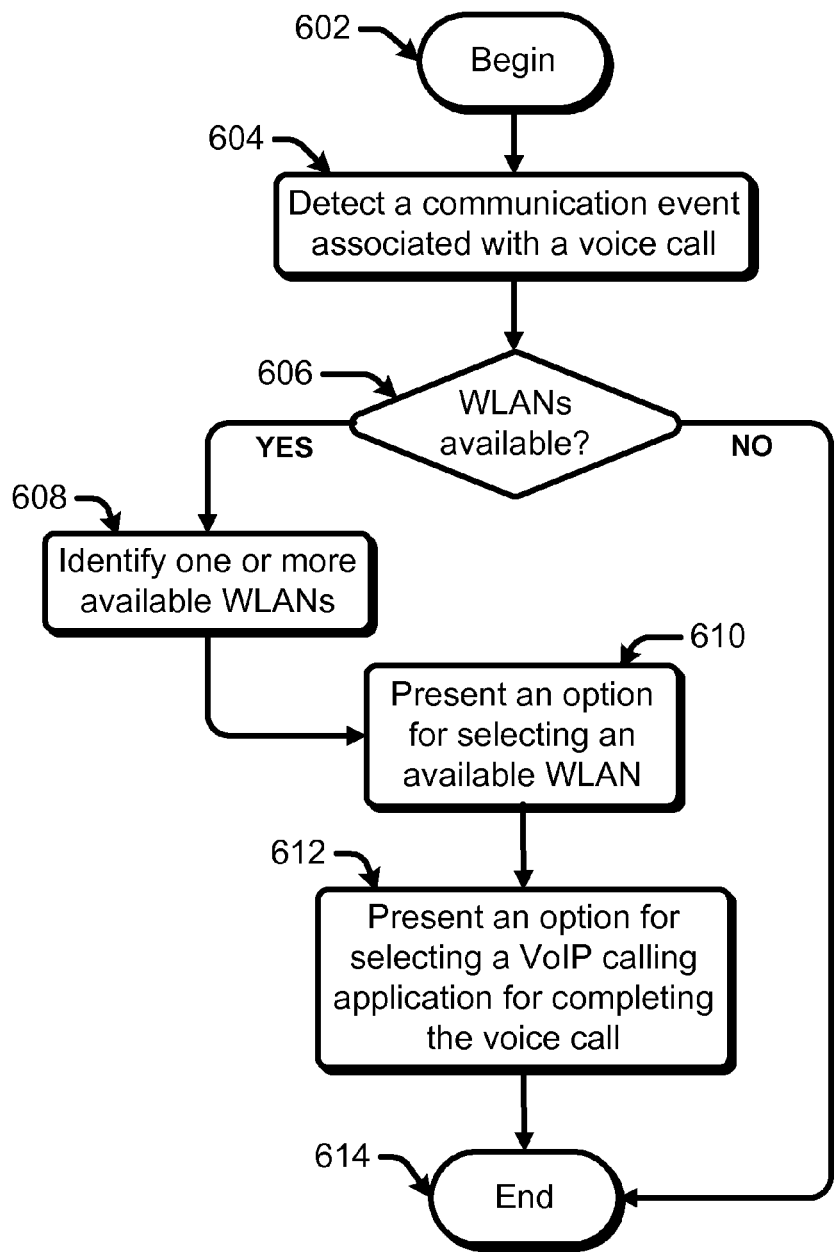
FIG. 6 depicts a flow diagram showing a WLAN discovery and notification procedure for a voice call session, in accordance with embodiments of the disclosure.

FIG. 6 depicts a flow diagram showing a WLAN discovery and notification procedure 600, which may be initiated in response to a communication event that is associated with a voice call, in accordance with various implementations of the disclosure. The WLAN discovery and notification procedure 600 begins block 602, at a time when a communication event occurs (e.g., a voice call initiation or a voice call failure). Initially, at block 604, the communication event is detected (e.g., by the network detection/measurement component 114 of the WLAN manager 112).

Next, at block 606, a determination is made as to whether one or more WLANs are available as an alternative communication network to the cellular network. In a scenario where NO other WLANs are available as an alternative communication network, the process ends at block 614. In this situation, the current cellular service is maintained until another communication service becomes available. Alternatively, in a scenario where one or more other WLANs are available as an alternative communication network, the process proceeds to block 608, where all available WLANs are identified as alternative communication service options.

Then, the process proceeds to block 610 where a notification indicating WLAN availability is presented (e.g., via the notification interfaces 304 and 404). In an embodiment, the notification/advertisement component 116 of the WLAN manager may be responsible for presenting the notification indicating WLAN availability. Thereafter, at block 612, an option for selecting a VoIP calling application for completing the voice call is presented (e.g., via the notification interfaces 304 and 404). Subsequently, the process ends at block 614.

Figure 7:
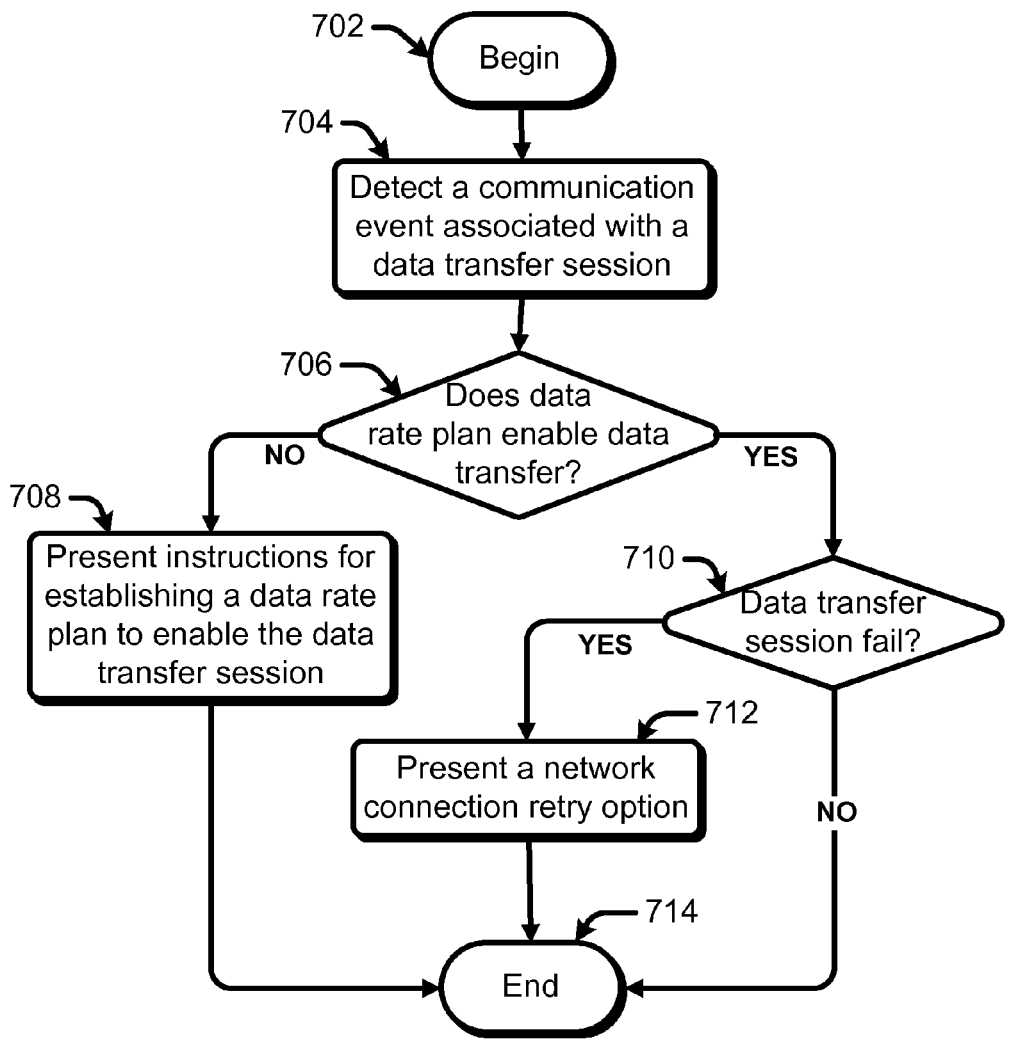
FIG. 7 depicts a flow diagram showing a data rate plan establishment procedure, in accordance with embodiments of the disclosure.

FIG. 7 depicts a flow diagram showing a data rate plan establishment procedure 700, which may be initiated in response to a communication event that is associated with a data transfer session (e.g., a data transfer session associated with a software application 110 stored in the memory 106 of the telecommunication device 100), in accordance with various implementations of the disclosure. The data rate plan establishment procedure 700 begins block 702, at a time when a communication event occurs (e.g., a data transfer session initiation or a data transfer session failure). Initially, at block 704, the communication event is detected (e.g., by the network detection/measurement component 114 of the WLAN manager 112).

Next, at decision block 606, a determination is made as to whether a data rate plan (e.g., a data rate plan associated with a corresponding telecommunication service subscriber) exits. In a scenario where a data rate plan is determined NOT to exist (e.g., in association with a particular telecommunication service subscriber), the process proceeds to block 708, where instructions for establishing a data rate plan to enable the data rate transfer session are presented (e.g., via the notification interface 804 presented at a display of a telecommunication device 802 in FIG. 8). Subsequently, the process ends at block 714.

Alternatively, in a scenario where a data rate plan is determined to exist, the process proceeds to decision block 710, where a determination is made as to whether a data transfer session that is associated with the existing data rate plan, has failed. In a scenario where the data transfer session associated with the existing data rate plan has NOT failed, the process ends at block 714. However, in a scenario where the data transfer session associated with the existing data rate plan has failed, the process proceeds to block 712, where a connection retry option is presented (e.g., via the notification interface 804). Subsequently, the process ends at block 714.

Figure 8:
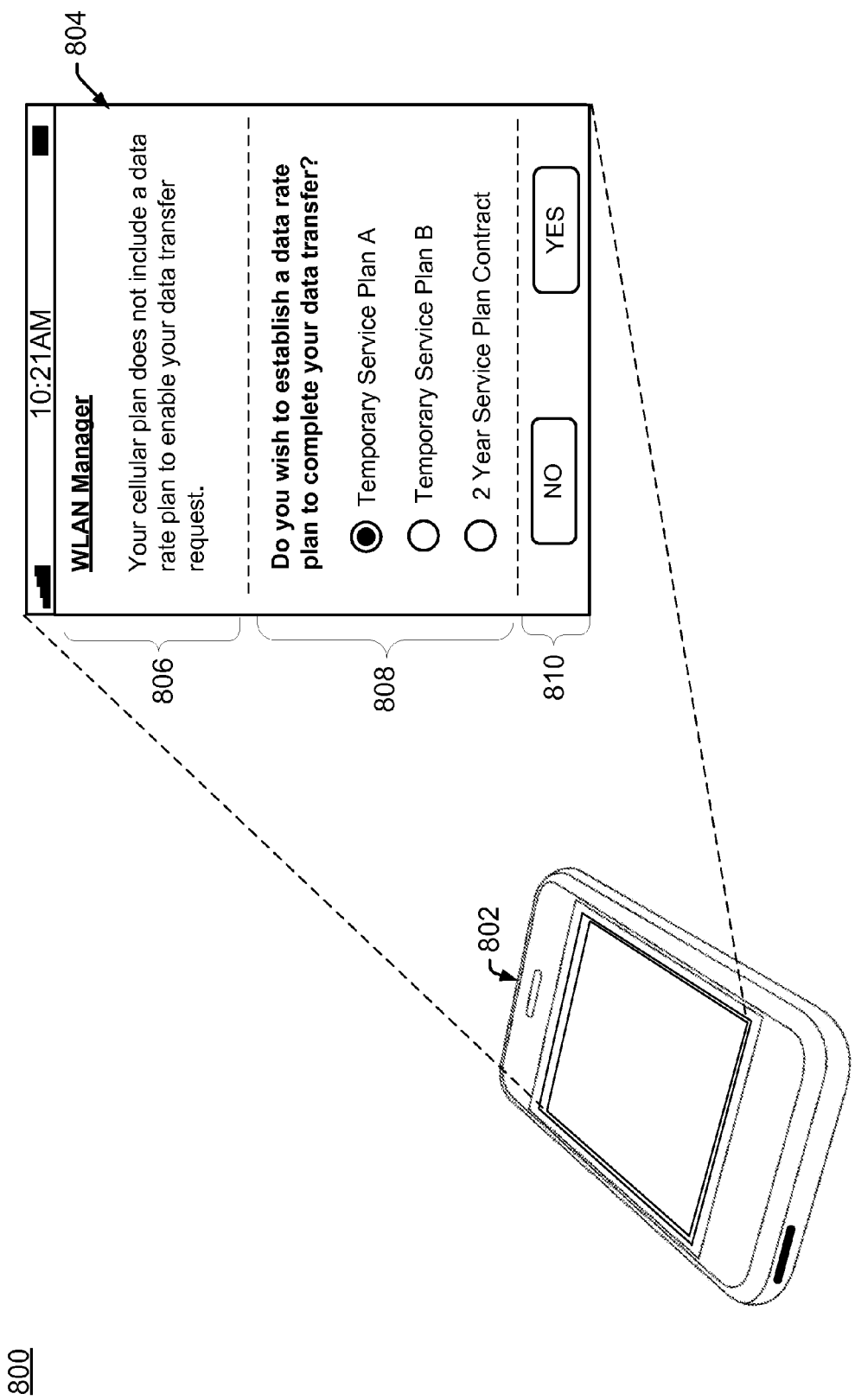
FIG. 8 depicts a notification interface of a WLAN manager at a telecommunication device for establishing a data rate plan, in accordance with embodiments of the disclosure.

FIG. 8 depicts a diagram 800 including an example notification interface 804 presented at a display of a telecommunication device 802 for establishing a data rate plan, in accordance with embodiments of the disclosure. In various embodiments, the notification interface 804 may correspond to an interface that is generated and/or displayed by the notification/advertisement component 116 of the WLAN manager component 112. In an implementation, the notification interface 804 may include an area 806 for indicating that a current cellular service plan does not include a data rate plan to enable a corresponding data transfer request.

The notification interface 804 can also include an area 808 presenting an option that allows a user of the telecommunication device 802 to establish a data rate plan, with which to complete a data transfer associated with the data transfer request. In various implementations, any number of alternative data rate plans for completing the requested data transfer may be presented in the presentation area 808, such as one or more temporary service plans and/or one or more extended (e.g., for a period greater than one year) service plans. After a data rate plan selection has been made, the user of the telecommunication device 802 can establish the corresponding data rate plan (e.g., "Temporary Service Plan A") by clicking the "YES" button in the command button area 810 of the notification interface 804.

In an embodiment, to make a WLAN discoverable, the notification/advertisement component 116 of the WLAN manager 112 may provide notifications that one or more WLAN access points are located nearby the telecommunication device 100. These notifications can also include information describing how to establish connections on the nearby WLAN access points. In another implementation, when a telecommunication device 100 begins to exit a coverage area of a WLAN access point, the notification/advertisement component 116 of the WLAN manager 112 may provide a notification to the user indicating that their WLAN connection is about to fail. In this manner, a boundary region of a WLAN coverage area is discoverable by a user of the telecommunication device 100. Accordingly, the risk of a dropped communication session can be avoided by an informed user.

In various implementations, notifications may be generated by the notification/advertisement component 116 of the WLAN manager 112, and these notifications can take many alternative forms. By way of example, a notification may be visual, such as by presenting a modal or non-modal dialog box that can provide a message indicating that a WLAN access point is nearby, and optionally listing a selectable enumeration of various WLAN connection choices.

However, in other implementations, notifications presented by the notification/advertisement component 116 of the WLAN manager 112 need not be visual. For example, in a scenario where a user is engaged in a voice call, the user may not be looking at the display of their telecommunication device. In this scenario, a notification may be presented in the form of an audible sound, such as a beep, or a brief series of tones, that prompt the user to look at their device display to view a corresponding notification.

In various embodiments, as a telecommunication device approaches a WLAN access point, a user of the telecommunication device may be made aware of access point by detecting a Tx signal of the access point. Alternatively, in a scenario where the mobile device is out of the coverage area of the WLAN access point, a device user may be made aware of local access points as collected by a cellular service operator. Further, in other scenarios, the telecommunication device may be pre-configured to recognize locations of known WLAN access points, such as WLAN access points located in the user's home, business, or at local coffee shop.

In a scenario where a telecommunication device is proximately located to a WLAN access point, the mobile device may provide a notification indicating the location of the nearby, soon-to-be in range, access point. IN an embodiment WLAN proximity may be determined based on whether the telecommunication device located is within a predetermined distance from the access point (e.g., within 20 yards of a known WLAN access point). Further, the mobile device may filter a presentation of one or more WLAN access points, so as to only display public WLAN access points or WLAN access points that the telecommunication device user has privileges to access.

In some implementations, the notification may provide additional information about a WLAN access point, such as a street address, the name of a business or public establishment, geo-coordinates of the access point, and/or other location information as to inform the user of the telecommunication device of the location of the WLAN access point. In this manner, the user of the telecommunication device may be able to relocate to a coverage area of a WLAN access point.

In other embodiments, a telecommunication device may be roaming near the edge of the coverage area of a WLAN access point. This may coverage boundary can be determined by various QoS measurements, including a received signal strength indication (an RSSI) and/or a bit error rate meeting predetermined performance thresholds. In a scenario where a telecommunication device roams beyond the coverage zone of a serving WLAN access point, the WLAN connection will be lost, and any applications relying on that connection will fail.

In order to prevent this communication failure scenario, the telecommunication device can provide a notification to the user that the device is leaving the coverage area of the WLAN access point. This notification may be based on what data application(s) is being operated at the telecommunication device. For example, in a scenario where a video streaming application is in use, the notification may come in the form of a visual notification or an audible notification, so as to not disrupt video playback. In response to this notification, a user of the telecommunication device may opt to move closer to the WLAN access point.

In various embodiments, a user of a telecommunication device may attempt to connect to a software application to the Internet via a cellular or WLAN access point to facilitate a data rate transfer. For example, the user may be opening a data-based application such as an Internet browser or an electronic mail client. In a scenario where a user of the telecommunication device does not have a data rate plan to enable the data rate transfer, multiple network connections and corresponding data rate plans can be presented at an interface of the telecommunication device.

Alternatively, the telecommunication device may be configured to list select, available network connections and corresponding data rate plans may be filtered based on whether those network connections have one or more cellular or WLAN access points at the mobile device's present location. Alternatively, network service providers having network connections in the vicinity of the telecommunication device may advertise their presence to the telecommunication device user by transmitting an advertisement message to the user over an open communications channel. In other scenarios, where no network connections or data rate plans are available to a user of the telecommunication device at his or her present location, the telecommunication device may be configured to shut down a running, web-based software application and notify the user that the a network connection is not available.

In some implementations, a user of a telecommunication device selecting to purchase a data rate plan to enable a corresponding data rate transfer may be required to enter a credit card or other payment information into a service provider interface to pay for the selected data rate plan. Alternatively, the user of the telecommunication device may opt to have the corresponding feed for the data rate plan billed to them, in addition to the user's existing cellular service plan bill.

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A telecommunication device comprising:
   a radio transceiver;
   one or more processors; and
   a memory coupled to the one or more processors, and having a wireless local area network (WLAN) manager component, wherein the WLAN manager component is operable by the one or more processors to:
      detect an initiation of a communication event associated with a voice call, a video call, a data transfer session, or any combination thereof;
      determine a current state of a cellular network;
      determine whether one or more WLANs are available as an alternative, to the cellular network, for initiating the communication event; and
      in response to detecting the initiation of the communication event, to determining that the one or more WLANs are available as the alternative to the cellular network, and to determining that the current state of the cellular network is associated with poor cellular coverage or no cellular coverage, display a notification that:
         indicates that the one or more WLANs are available as the alternative, and
         provides a set of options that are selectable by a user of the telecommunication device for the initiation of the communication event, the set of options including an option for selecting continued cellular coverage for the initiation of the communication event and an option for selecting the one of the one or more WLANs for the initiation of the communication event.

2. The telecommunication device of claim 1, wherein the one or more WLANs correspond to available Wi-Fi networks that are detected by the radio transceiver.

3. The telecommunication device of claim 1, wherein the notification includes information indicating the current state of the cellular network.

4. The telecommunication device of claim 1, wherein the communication event is associated with
   i) a voice call, and the notification includes an option for selecting a voice over Internet protocol (VoIP) calling application for initiating the voice call, or
   ii) a video call, and the notification includes an option for selecting a video calling application for initiating the video call.

5. The telecommunication device of claim 1, wherein the communication event is associated with the data transfer session, and wherein the WLAN manager component is further operable by the one or more processors to determine whether the telecommunication device is associated with a data rate plan for initiating the data transfer session.

6. The telecommunication device of claim 5, wherein the notification includes instructions for establishing a data rate plan for enabling the data transfer session, when the telecommunication device is determined not to be associated with a data rate plan for initiating the data transfer session.

7. A method comprising:
 detecting, at a telecommunication device, an initiation of a voice call;
 determining a current state of a cellular network;
 in response to detecting the initiation of the voice call, identifying one or more wireless local area networks (WLANs) as being available, as an alternative to the cellular network, for enabling the initiation of the voice call; and
 in response to detecting the initiation of the voice call and the identifying the one or more WLANs as being available for enabling the initiation of the voice call, presenting, at a display of the telecommunication device, a notification indicating an availability of the one or more WLANs and including an option for selecting by a user of the telecommunication device a WLAN of the one or more WLANs and an option for selecting by the user of the telecommunication device continued cellular coverage to enable the voice call.

8. The method of claim 7, wherein the notification further includes information indicating the current state of the cellular network.

9. The method of claim 7, wherein the notification further includes an option for selecting a voice over Internet protocol (VoIP) calling application for enabling the voice call.

10. A computer storage device with a stored computer-executable program, which, when executed by one or more processors of a telecommunication device, performs operations comprising:
 detecting an initiation of a voice call or a video call;
 determining a current state of a cellular network;
 identifying one or more Wi-Fi networks for enabling the voice call or the video call; and
 in response to detecting the initiation of the voice call or the video call, generating for display on the telecommunication device a notification that indicates each of:
 an availability of the one or more Wi-Fi networks,
 the current state of the cellular network,
 an option for selecting by a user of the telecommunication device a Wi-Fi network of the one or more Wi-Fi networks to enable the initiation of the voice call or the video call, and
 an option for selecting by the user of the telecommunication device continued cellular coverage to enable the initiation of the voice call or the video call.

11. The computer storage device of claim 10, wherein: the initiation is associated with
 i) the voice call, and the notification includes an option for selecting a voice over Internet protocol (VoIP) calling application for enabling the voice call, or
 ii) the video call, and the notification includes an option for selecting a video calling application for enabling the video call.

12. The telecommunication device of claim 1, wherein the WLAN manager component is further operable by the one or more processors to:
 determine, during the communication event and based on a coverage area of the one or more WLANs, a probability of failure associated with a connection with the one or more WLANs;
 in response to the probability of failure being greater than a threshold, generate a second notification that indicates the probability of failure associated with the connection with the one or more WLANs.

13. The method of claim 7, wherein the presenting the notification is further in response to the current state of the cellular network being associated with poor cellular coverage or no cellular coverage.

14. The telecommunication device of claim 1, wherein determine the current state of the cellular network comprises receiving, from the radio transceiver, one or more Quality of Service (QoS) metrics associated with a serving cellular access point measured by the radio transceiver.

15. The method of claim 7, wherein determining the current state of the cellular network comprises receiving, from a radio transceiver of the telecommunication device, one or more Quality of Service (QoS) metrics associated with a serving cellular access point measured by the radio transceiver.

16. The computer storage device of claim 10, wherein determining the current state of the cellular network comprises receiving, from a radio transceiver of the telecommunication device, one or more Quality of Service (QoS) metrics associated with a serving cellular access point measured by the radio transceiver.

* * * * *